Patented Jan. 28, 1936

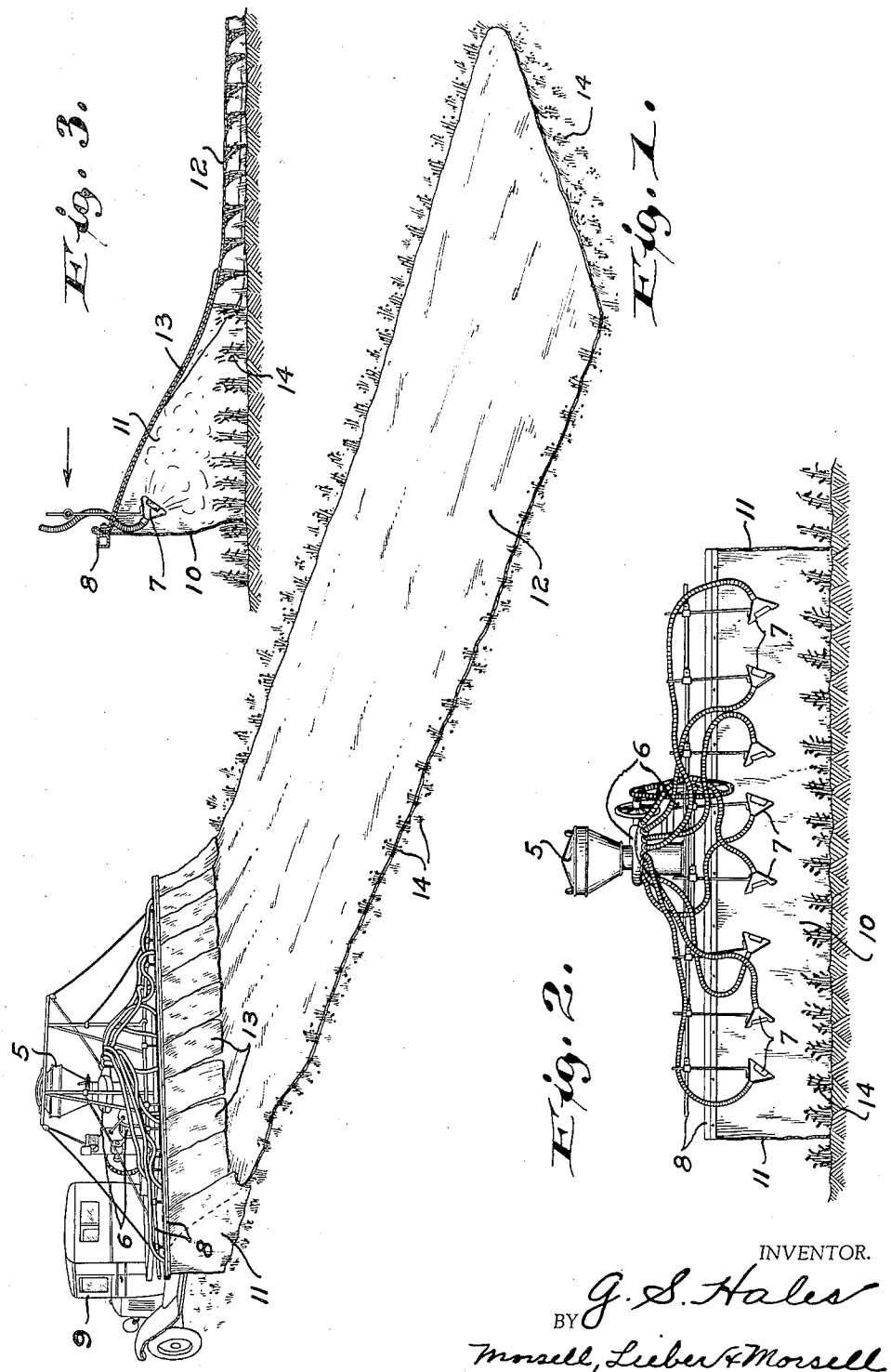

2,029,166

UNITED STATES PATENT OFFICE 2,029,166

ART OF TREATING VEGETATION

Guy S. Hales, Port Washington, Wis.

Application March 21, 1934, Serial No. 716,569

7 Claims. (Cl. 43—148)

The present invention relates in general to improvements in the art of treating vegetation and relates more specifically to an improved process of and apparatus for subjecting growing plants to treatment for the elimination of pests or diseases.

Numerous attempts have heretofore been made to combat the ravages of the pea aphis by subjecting the growing vines to clouds of poisonous dust, such as nicotine sulphate. One type of dusting apparatus for thus treating vegetation comprises generally a mixer, a blower for withdrawing the dust directly from the mixer and for delivering the same thru a series of nozzles toward the plants, an apron trailing from the zone of the nozzles, and a motor-propelled vehicle for hauling the dust mixing and distributing mechanism along the growing plant rows. The zone of initial application of the dust in these prior machines was left open at the front and sides, and the trailer aprons heretofore employed were relatively narrow and short in the direction of advancement; and these dusters were, moreover, relatively ineffective and objectionable both because of the inability to properly apply the poison to the plants, and due to the excessive loss of dust and gas.

It has been discovered that efficient dusting requires application of the dust for a rather extended period of time, at least thirty seconds, to insure destruction of the aphis; and in order to provide for the proper length of time, the dust, after being applied to the plants, should be so confined by means of a relatively long trailer apron as to permit advancement of the tractor at a desirably high rate of speed. The clouds of dust created by the blower should also be confined within an advancing enclosure to which the plants are directly exposed in order to eliminate loss of dust and gas due to air disturbances, and the plants or vines should be gently agitated so as to insure thorough distribution of the poison over all of the infected areas. Then too, darkness tends to excite the aphis and to increase their respiration, so that application of the poison and liberation of the poison gas under darkened conditions will more effectively and quickly kill the pest. Since it is preferable to deliver the dust to the plants at a relatively high temperature in order to cause the poisonous compound gases to most effectively volatilize and increase the density thereof, the generated, heated gases should, if possible, be urged in contact with the plants before final cooling thereof; and all of these several features have been found to be relatively important in producing most efficient treatment of the vegetation both quickly and automatically.

It is therefore an object of the present invention to provide an improved method of and apparatus for most effectively treating vegetation, such as growing plants, with poisonous dust from which poisonous gas is obtainable by volatilization.

Another specific object of the invention is to provide an improved process of and equipment for readily dusting plants in a minimum period of time and without undesirable loss of the dusting material and gas.

A further specific object of the invention is to provide improved instrumentalities for applying poison to plants, such as pea vines, while the latter are being gently agitated and while they are confined in substantial darkness for a period of time sufficient to provide for most effective treatment.

Still another specific object of the invention is to provide a method of applying heated aeriform substances to foliage before undesirable dispersion of the heat and under most effective conditions.

These and other objects of the invention will be apparent from the following detailed description.

A clear conception of one mode of applying the invention, and of the construction of one form of apparatus especially adapted to carry on the improved process of treating vegetation by the application of poison dust, may be had by referring to the drawing accompanying and forming a part of this specification, in which like reference characters designate the same or similar parts in the several views:

Fig. 1 is a perspective view of a tractor-drawn plant dusting machine in operation, looking toward the rear of the apparatus;

Fig. 2 is an enlarged section taken transversely thru the dust injecting zone of the improved machine; and Fig. 3 is a similarly enlarged fragmentary section thru the dust injecting zone and trailer apron of the machine.

While the invention will be described herein as being specifically applied to a method of and apparatus for exterminating the pea aphis from the growing vines by the application of nicotine sulphate in the form of pre-heated dust, it is not intended to thereby limit the range of application and novel steps or features, at least some of which are believed to be applicable with similar advantages, to the treatment of other diseases and pests with other forms of the apparatus.

Referring to the drawing, the apparatus shown therein and which has been successfully utilized in the exploitation of the present improved process, comprises in general a mixer 5 for the dusting material; a blower 6 adapted to receive the mixed dust from the mixer 5; a series of vertically adjustable nozzles 7 supported by a frame 8 and connected to the blower 6; a tractor 9 for transporting the frame 8 and the dusting apparatus over the ground; front and side flaps 10, 11 respectively, for partially enclosing the dusting zone; and a trailer apron 12 of considerable length attached to the frame 8 and completing the enclosure for the dusting zone.

The mixer 5 and blower 6 are of relatively standard and well-known construction, and this apparatus is quite effective in producing nicotine dust by mixing liquid nicotine sulphate with hydrated finishing lime and in delivering such mixture in somewhat heated condition to a series of nozzles 7, such as illustrated. The heating of the material in the mixer 5 and blower 6 is produced by friction and by the chemical reaction, and this heating is highly desirable when a nicotine compound is utilized since it liberates the nicotine fumes and gives the dust maximum killing effect. The heat generated in such a mixture also drives off any excess moisture in the dust, thus making it possible to more effectively distribute the dust when it is finally discharged from the nozzles 7. The nozzles 7, which are also of relatively standard construction, may be of any desired number and are preferably arranged so as to effectively discharge the dust toward the plants 14 which are confined within the dusting zone. These nozzles 7 are vertically adjustable with respect to the carrier frame 8 and communicate with the blower 6 thru a series of flexible tubes, in a well-known manner.

While the mixer 5, blower 6, nozzles 7, and tractor 9 are of well-known and relatively standard construction, these elements have heretofore been used in conjunction with relatively ineffective equipment for confining and applying the dust to the plants 14; and the front and side flaps 10, 11, as well as the relatively long apron 12, are important features of the present improvement. The flaps 10, 11 are preferably formed of relatively stiff and opaque waterproof fabric or similar sheet material; and the front flap 10 may be permanently suspended from the fixed front bar of the supporting frame 8 in such a manner that the bottom of this flap will brush over the tops of the plants 14 as the tractor 9 advances along the ground. The side flaps 11 are likewise suspended from the frame 8 and may have their front edges secured to the adjacent ends of the front flap 10, and the lower ends of these side flaps preferably extend in close proximity to the ground. The trailer apron 12 is preferably formed of a relatively light but opaque waterproof fabric, and the forward end of this apron is detachably connected to the front bar of the frame 8 near the top of the front flap 10. A series of auxiliary flaps 13 formed of flexible sheet material may also be provided above the forward end of the trailer apron 12, and this apron is preferably at least one hundred feet in length and of any suitable width, with the side edges retained as close as possible to the ground surface by means of marginal cables or weights. The auxiliary flaps 13 are of sufficient length and weight to hold the forward end of the main apron 12 approximately in the position shown in Fig. 3 when the apparatus is advancing along the ground.

During normal use of the improved dusting apparatus, in order to carry out the steps of the present improved method of treating vegetation, the tractor 9 is being driven at a normal rate of approximately nine thousand feet per hour to cause the concealed dusting zone and the apron 12 to advance along the rows of vines or plants 14 in the manner illustrated in Figs. 1 and 3. When traveling at this rate of speed, the plants 14 remain concealed in the darkened area afforded by the flaps 10, 11 and the apron 12 for a period of approximately forty seconds; and these elements also increase the density of the gas by virtue of the confined space produced thereby. The treating material delivered to the mixer 5 is being delivered in heated condition and in cloud-like form by the blower 6 thru the nozzles 7 into the darkened dusting zone, to which the plants 14 are initially exposed; and the downwardly and rearwardly sloping forward portion of the apron 12 quickly urges the dust clouds into intimate contact with the plants 14 while the latter are being gently agitated under darkened condition by the trailer apron 12 for the forty seconds' period of time.

In order to produce effective treatment, it has been found that at least thirty seconds, and in most cases, forty seconds, of concealment is required in order to exterminate pea aphis. By utilizing an apron 12 which is at least one hundred feet in length, the tractor 9 may be actuated at a practical speed of approximately nine thousand feet per hour. The use of such relatively long trailer apron 12 also causes the midportion of this apron to lift only slightly away from the ground when the air and dust become confined thereunder, thus eliminating excessive drag upon the plants 14 while maintaining the same in a state of gentle agitation. The darkened condition produced by the front and side flaps 10, 11 cooperating with the apron 12, increases the activity and the respiration of the aphis and thus permits the released poison gases to become more effective; and this enclosure of the dusting zone also prevents excessive loss of dust and gas due to air currents such as wind. When the dust is delivered from the nozzles 7, it is in heated condition; and this heating, besides dispersing moisture, enhances the volatilization of the poison whereupon the restricted space produced by the apron 12 increases the density and insures direct application of the poison gases to the infected foliage.

It will therefore be apparent that the improved equipment will effectively insure rapid and efficient application of the poison to the infected plants 14 with minimum loss of the poison dust and gas. While the apparatus may be varied in construction, it has been found that the structure herein shown and specifically described has proven highly practical and commercially successful in the treatment of growing peas with the nicotine sulphate, the strength of which may be varied to meet conditional requirements. The equipment is also capable of treating a relatively wide stretch of plant rows, and the treatment of the plants may be repeated as frequently as desired or as may be necessary to insure complete extermination of the pest.

It should be understood that it is not desired to limit the invention to the exact details of construction of apparatus or to the precise mode of utilizing the same, herein shown or described, for various modifications within the scope of the claims may occur to persons skilled in the art.

It is claimed and desired to secure by Letters Patent:

1. The process of treating vegetation, which comprises, totally confining the plants while simultaneously advancing a zone of application of volatile treating material therealong, and subsequently maintaining such total confinement of the plants while gradually and positively forcing the volatile material into intimate contact therewith for a definite period of time after such initial application of the treating material.

2. The process of treating vegetation, which comprises, totally confining the plants in an advancing zone, and simultaneously applying volatile treating material to the plants within said zone, and subsequently gradually and positively forcing the volatile treating material downwardly into intimate contact with the plants while maintaining the same confined in substantial darkness for at least thirty seconds and while gently agitating the same.

3. In combination means forming a totally enclosed zone to which plants are directly exposable, means for injecting treating material into said zone, means for advancing said enclosing means along successive plants, and a trailer apron of approximately one hundred feet in length directly engaging the plants and adapted to maintain the same enclosed for a substantial period of time to gently agitate the plants after initial application of the treating material thereto.

4. In combination, means forming a totally enclosed chamber to which plants are directly exposable and a portion of which provides a free space above the plants, means for transporting said enclosing means along rows of the plants, means for injecting clouds of volatile treating material into the upper free space of said chamber during advancement thereof over the plants, and means for subsequently forcing the residual material from said chamber downwardly into intimate contact with the plants and for agitating the plants while retaining the latter confined in substantial darkness for a prolonged period of time.

5. The process of treating vegetation, which comprises, totally confining the plants in an advancing zone having a free space above the plants, injecting clouds of volatile treating material into the free space during advancement of the enclosed zone, and subsequently progressively and positively forcing the residual material from within said zone downwardly into intimate contact with the plants while retaining the latter in a confined state until final treatment has been effected.

6. In a dusting machine, a covering device for plants consisting of a horizontal support, a front apron depending from said support and having laterally and rearwardly extending portions connected to the support, an elongated apron secured to said support and adapted to be held in substantial trailing engagement with the rows of plants, said apron having its forward portion partially enclosed by said front apron, and intermediate flaps secured to said support above the forward portion of said trailer apron and adapted to urge an intermediate portion of said trailer apron into contacting relation with the plants.

7. In a dusting machine, a covering device for plants consisting of a horizontal support, a front apron depending from said support and having laterally and rearwardly extending portions connected to the support, an elongated apron secured to said support and adapted to be held in substantial trailing engagement with the rows of plants, said apron having its forward portion partially enclosed by said front apron, intermediate flaps secured to said support above the forward portion of said trailer apron and adapted to urge an intermediate portion of said trailer apron into contacting relation with the plants, and common securing means for attaching both of said aprons and said flaps to said support.

GUY S. HALES.